United States Patent
Tufano et al.

(10) Patent No.: US 10,486,337 B2
(45) Date of Patent: Nov. 26, 2019

(54) PROCESS FOR PRODUCING A GLASS FIBRE-REINFORCED THERMOPLASTIC POLYMER COMPOSITION

(71) Applicant: SABIC GLOBAL TECHNOLOGIES B.V., Bergen op Zoom (NL)

(72) Inventors: Carmela Tufano, Maastricht (NL); Gerard Jan Eduard Biemond, Brunssum (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 589 days.

(21) Appl. No.: 15/036,319

(22) PCT Filed: Oct. 31, 2014

(86) PCT No.: PCT/EP2014/073455
§ 371 (c)(1),
(2) Date: May 12, 2016

(87) PCT Pub. No.: WO2015/071118
PCT Pub. Date: May 21, 2015

(65) Prior Publication Data
US 2016/0279833 A1    Sep. 29, 2016

(30) Foreign Application Priority Data

Nov. 15, 2013 (EP) .................................... 13193050

(51) Int. Cl.
| | | |
|---|---|---|
| *B29B 15/12* | (2006.01) | |
| *B29B 9/14* | (2006.01) | |
| *B29K 23/00* | (2006.01) | |
| *B29K 309/08* | (2006.01) | |
| *B29K 101/12* | (2006.01) | |

(52) U.S. Cl.
CPC .............. *B29B 15/122* (2013.01); *B29B 9/14* (2013.01); *B29K 2023/12* (2013.01); *B29K 2101/12* (2013.01); *B29K 2309/08* (2013.01)

(58) Field of Classification Search
CPC ..... B29B 15/122; B29B 9/14; B29K 2023/12; B29K 2101/12; B29K 2309/08
See application file for complete search history.

(56) References Cited

U.S. PATENT DOCUMENTS

| | | | | |
|---|---|---|---|---|
| 4,169,186 | A * | 9/1979 | Tazaki | B05D 7/20 428/406 |
| 4,486,373 | A | 12/1984 | Kurauchi et al. | |
| 5,978,536 | A * | 11/1999 | Brandi | G02B 6/441 385/102 |
| 5,998,029 | A | 12/1999 | Adzima et al. | |
| 2008/0290547 | A1* | 11/2008 | Kashikar | B29B 11/12 264/119 |
| 2013/0295806 | A1 | 11/2013 | Imai et al. | |
| 2015/0246463 | A1* | 9/2015 | Brands | B29B 15/122 156/180 |

FOREIGN PATENT DOCUMENTS

| | | | | |
|---|---|---|---|---|
| EP | 0397505 | A2 | 11/1990 | |
| EP | 0872521 | A1 | 10/1998 | |
| EP | 2664643 | B1 * | 9/2015 | C08J 3/226 |
| WO | 0906551 | A2 | 2/1998 | |
| WO | 2009080281 | A1 | 7/2009 | |
| WO | 2009080821 | A2 | 7/2009 | |
| WO | WO-2012096273 | A1 * | 7/2012 | C08J 3/226 |

OTHER PUBLICATIONS

"Viscosity, Part 2: Melt Flow Index", Beaumont Technologies, Apr. 15, 2015, accessed at beaumontinc.com on Aug. 14, 2018. (Year: 2015).*
International Search Report for International Application No. PCT/EP2014/073455; International Filing Date: Oct. 31, 2014; dated Feb. 18, 2015; 5 Pages.
Written Opinion of the International Searching Authority for International Application No. PCT/EP2014/073455; International Filing Date: Oct. 31, 2014; dated Feb. 18, 2015; 3 Pages.

* cited by examiner

Primary Examiner — Anthony Calandra
Assistant Examiner — Jamel M Nelson
(74) Attorney, Agent, or Firm — Cantor Colburn LLP

(57) ABSTRACT

The present invention relates to a process for producing a glass fibre-reinforced thermoplastic polymer composition, comprising subsequent steps of unwinding from a package of a continuous glass multifilament strand and applying a sheath of thermoplastic polymer around said multifilament strand to form a sheathed continuous multifilament strand, wherein at least two continuous glass multifilament strands together are provided within said sheath of thermoplastic polymer, wherein said sheath of thermoplastic polymer surrounds said at least two continuous glass multifilament strands in such a way that said at least two continuous glass multifilament strands are in close contact with each other.

17 Claims, No Drawings

PROCESS FOR PRODUCING A GLASS FIBRE-REINFORCED THERMOPLASTIC POLYMER COMPOSITION

CROSS REFERENCE TO RELATED APPLICATIONS

This application is a 371 of International Application No. PCT/EP2014/073455, filed Oct. 31, 2014, which claims priority to EP 13193050.5, filed Nov. 15, 2013 which are incorporated herein by reference in their entirety.

The present invention relates to a process for producing a glass fibre-reinforced thermoplastic polymer composition, comprising subsequent steps of unwinding from a package of a continuous glass multifilament strand and applying a sheath of polypropylene around said multifilament strand to form a sheathed continuous multifilament strand.

Such process is known from International application WO 2009/080281. This published patent application discloses a process for producing a long glass fibre-reinforced thermoplastic polymer composition, which comprises the subsequent steps of i) unwinding from a package of at least one continuous glass multifilament strand, ii) applying an impregnating agent to said at least one continuous glass multifilament strand to form an impregnated continuous multifilament strand, and iii) applying a sheath of thermoplastic polymer around the impregnated continuous multifilament strand to form a sheathed continuous multifilament strand. WO 2009/080281 does not disclose the application of one sheath around more than one glass multifilament strands.

WO9806551 relates to a method of making a composite product comprising preparing a thermoplastic-encased composite strand material for disposing in a matrix material by steps comprising: applying a chemical treatment to coat substantially all of a plurality of fibers comprising reinforcing fibers to form preimpregnated fibers, gathering the preimpregnated fibers into a preimpregnated strand, encasing the preimpregnated strand by wire-coating the preimpregnated strand with a thermoplastic material and forming the thermoplastic coating into a thermoplastic sheath to form a thermoplastic-encased composite strand.

WO 2012/096273 discloses a molding material comprising a composite comprising 1 to 50 wt % of (A) a bundle of continuous reinforcing fibers and 0.1 to 40 wt % of (B) a polyarylene sulfide prepolymer or (B') a polyarylene sulfide; and 10 to 98.9 wt % of (C) a thermoplastic resin adhered to said composite; wherein said composite further comprises (D) a zero-valent transition metal compound in an amount of 0.001 to 20 mol % based on the amount of sulfur atoms contained in said component (B) or (B'). The method for producing such a molding material comprises the steps of (I) withdrawing and continuously feeding (A') a continuous reinforcing fiber substrate; (II) compositing said component (A') with (B) a polyarylene sulfide prepolymer; (III) heating the thus obtained composite to convert said component (B) into (B') a polyarylene sulfide; and (IV) cooling and taking up the resulting composite; wherein, in said step (III), said component (B) is converted into said component (B') by polymerizing said component (B) under heat in the presence of (D) a zero-valent transition metal compound. D1 discloses that the molding material may have a core-in-sheath structure wherein the thermoplastic material (C) surrounds the core consisting of the bundle of fibers and the polyarylene sulfide prepolymer or the polyarylene sulfide. WO 2012/096273 does not disclose a core-in-sheath structure wherein more than one bundle of fibers are held together by the thermoplastic sheath. WO 2012/096273 does not relate to glass fiber reinforced polypropylene materials.

EP 0872521 discloses a molding material, comprising at least the following components [A], [B] and [C], with the component [C] arranged to contact a composite comprising the components [A] and [B], wherein component [A] is a continuous reinforcing fiber bundle, component [B] is a thermoplastic polymer or oligomer with a weight average molecular weight of 200 to 50000 and a melt viscosity lower than that of the component [C] and component [C] is a thermoplastic resin with a weight average molecular weight of 10000 or more. EP 0872521 does not specifically relate to glass fiber reinforced polypropylene materials.

U.S. Pat. No. 4,486,373 discloses a method for producing a fiber reinforced thermoplastic resin composite material for molding, which comprises the steps of: applying an uncured, thermally curable resin continuously to the surfaces of reinforcing glass fibers in the form of rovings; successively introducing said rovings through a strand guide into a thermoplastic resin in an extrusion molding machine to extrusion mold a resin strand comprising said thermoplastic resin in which said rovings are axially buried; immediately cooling said resin strand for minimizing reaction of said uncured, thermally curable resin; and cutting said resin strand into pellets, thereby allowing said thermally curable resin to remain uncured, and allowing said thermally curable resin to be cured, when molded, simultaneously with a dispersion of said glass fibers to provide a molded product having high mechanical strength due to a strong chemical bond between said glass fibers and said thermoplastic resin via said thermally curable resin.

Introduced more than a half century ago, fibre-reinforced plastics are composite materials with a wide range of applications in industry, for example in the aerospace, automotive, shipping, building and construction industries. The term "composite" can apply to any combination of individual materials, for example to a thermoplastic polymer (the matrix) in which fibres (reinforcing filler) have been dispersed. A great diversity of organic fibres, including synthetic fibres such as polyamide, polytetrafluoroethylene, polyesters, natural fibres, such as cotton, hemp, flax, jute; and inorganic fibres, such as glass fibres are often used as reinforcements in composite materials.

The reinforced plastics industry has been using glass fibres in different forms for reinforcing polymer matrices to produce a diversity of products. Glass fibres are generally supplied as a plurality of continuous, very long filaments, and can be in the form of strands, rovings or yarns. A filament is an individual fibre of reinforcing material. A strand is a plurality of bundled filaments. Filaments are bundled into strands and then wound on bobbins to form a package. A glass multifilament strand, such as disclosed in WO 2009/080281 is also referred to as a roving.

Long glass fibre-reinforced thermoplastic polymer compositions—optionally in the form of, for example, pellets or granules-are also being used in industry because they possess excellent mechanical strength, heat resistance and formability. Long glass fibre-reinforced compositions are generally prepared by sheathing or wire-coating process, by crosshead extrusion or several pultrusion techniques. Using these technologies, impregnated or coated fibre strands are formed; these may then be cut into lengths, the pellets or granules thus obtained being suitable for further processing, i.e. for injection moulding and compression moulding as well as for extrusion compression moulding processes, into (semi)-finished articles. Long glass fibre-reinforced polymer compositions contain glass fibres having a length of at least 1 mm, often at least 2 mm and typically between 5 and 20 mm. As a result, glass fibres in moulded articles made from long glass fibre-reinforced polymer compositions generally are of higher length than in articles made from short glass fibre reinforced compositions, resulting in better mechanical properties.

In a pultrusion process, a bundle of continuous glass filaments is spread out into individual filaments and drawn through an impregnation die, into which the molten thermoplastic is injected, aiming at entirely wetting and impregnating each filament with the molten thermoplastic. A strand of diameter of about 3 mm is drawn from the die and then cooled. Finally the strand is chopped into segments of the desired length. The glass fibres are generally parallel to one another in the segment, with each fibre being individually surrounded by the thermoplastic.

The process of sheathing or wire-coating is done without wetting the fibres individually with thermoplastic material, but by forming a continuous outer sheath, also called coating or skin, of a thermoplastic material, such as polypropylene, around the continuous multifilament strand. The so obtained sheathed continuous multifilament strand is then chopped into pellets or granules of desired length, e.g. in the range of about 10-18 mm length, for example 15 mm, in which the fibres are generally parallel to one another and have the same length as the pellets or granules.

The pellets may be further supplied to an injection moulding or compression moulding machine, and during this moulding step the glass fibres are dispersed within the thermoplastic polymer and formed into moulded (semi) finished articles. A skilled person will understand that the thermoplastic material will only form the sheath and that it will not penetrate through the individual filaments of the multifilament strand.

In order to further improve properties of moulded articles, the continuous strand can be treated with an impregnating composition, or impregnating agent, before applying the sheath of thermoplastic polymer. Such impregnating agent allows a better dispersion of the individual fibres in the final moulding and consequently results in improved mechanical properties thereof. Long fibre reinforced thermoplastics in the form of pellets may be provided with any desired amount of fibre content. However, to reduce the amount of grades that need be produced manufacturers prefer to manufacture only a limited number of different grades, i.e. only a distinct number of grades wherein each grade contains a specific amount of (glass) fibre. For example, glass fibre reinforced polypropylene grades under the brand name Stamax, available from SABIC, may be manufactured in for example 20, 30 40, 50 and 60 weight % of glass fibre. Then during moulding the desired glass fibre amount in the final product (i.e. the moulding) may be obtained by diluting either of such grades using the same or a different polypropylene as the polypropylene used as the sheathing material.

Consequently there is a need for high glass fibre content granules, meaning that during the manufacture the ratio of the thermoplastic polymer sheath to glass needs to be reduced.

In the art there is also need for a more efficient and a higher throughput process for producing a glass fibre-reinforced thermoplastic polymer composition.

A drawback of the process of WO2009/080281 is that at higher glass concentrations the thermoplastic polymer sheath will be too thin resulting in the risk of bursting of the thermoplastic polymer sheath after the application of said sheath. This phenomenon is referred to as the "zebra-effect". Pellets which have a (partially) burst sheath may lose the fibres contained in the thermoplastic polymer resulting in what is referred to as "free glass", which in turn is highly undesirable.

The object of the present invention is therefore to provide a process for producing a glass fibre-reinforced thermoplastic polymer composition which does not show the disadvantages mentioned above, in particular which does not show the "zebra-effect" or at least wherein the zebra-effect is reduced to a minimum.

Another object of the present invention is to provide a process for producing a glass fibre-reinforced thermoplastic polymer composition having a high glass fibre content at high throughput.

This object is achieved according to the invention with a process as defined by the claims. More specifically, the present invention concerns a process for producing a glass fibre-reinforced thermoplastic polymer composition, comprising the subsequent steps of unwinding from a package of at least one continuous glass multifilament strand and applying a sheath of thermoplastic polymer around said multifilament strand to form a sheathed continuous multifilament strand, wherein:

at least two continuous glass multifilament strands together are provided within said sheath of thermoplastic polymer, the thermoplastic polymer of the sheath is polypropylene, said sheath surrounds said at least two continuous glass multifilament strands,
the amount of glass in the composition is from 30 to 75 wt. % on the basis of the total weight of the composition.

In view of the process, it has to be understood that the sheath of thermoplastic polymer surrounds the at least two continuous glass multifilament strands in such a way that the at least two continuous glass multifilament strands are in close contact with each other.

Surprisingly, by providing at least two continuous glass multifilament strands together within the same sheath of thermoplastic polymer, wherein the sheath of thermoplastic polymer surrounds said at least two continuous glass multifilament strands the present process allows stable and constant production and good reproducibility during the sheathing step, and results in glass fibre-reinforced thermoplastic products of constant quality, and in pellets that do not show the "zebra-effect".

Another advantage is that a higher number of strands per extrusion die can be handled resulting in a higher yield. Consequently, the process according to the invention can be operated at high throughput rates, with constant product quality.

According to a preferred embodiment of the present invention three continuous glass multifilament strands together are provided within said sheath of thermoplastic polymer. By providing three continuous glass multifilament strands together within the same sheath of thermoplastic polymer an even lower ratio of polymeric sheath to glass can be attained, that is a higher glass fibre content compared to the well-known glass fibre-reinforced thermoplastic polymer composition in which only one single continuous glass multifilament strand is present.

The number of continuous glass multifilament strands within one and the same thermoplastic polymer sheath is in principle not restricted but the present inventors assume that the "zebra-effect" can be prevented in a proper way when the number of continuous glass multifilament strands is at most 5, preferably at most 4.

In the present invention it is preferred to apply an impregnating agent to each continuous glass multifilament strand before the application of said sheath of thermoplastic polymer around said multifilament strands. Such an individual impregnation of each continuous glass multifilament strand has provided a positive influence on the "zebra-effect", especially for glass fibre-reinforced thermoplastic polymer composition having a glass content of from 35 wt. % to 50 wt. % such as about 40 wt. %.

According to another embodiment it is also possible to apply an impregnating agent to the at least two continuous glass multifilament strands together before the application of said sheath of thermoplastic polymer around said multifilament strands. Such an application of impregnating agent results in a higher throughput of continuous glass multifilament strands. In addition, such an impregnation of combined continuous glass multifilament strands has provided a positive influence on the "zebra-effect", especially for glass fibre-reinforced thermoplastic polymer composition having a glass content of from (more than) 50 wt. % to 75 wt. % such as about 60 wt. %.

In another embodiment the impregnating agent is applied to the at least three continuous glass multifilament strands together before the application of said sheath of thermoplastic polymer around said multifilament strands.

The amount of glass is preferably in the range of 35 wt. % to 75 wt. %, on basis of the total weight of the sheathed continuous multifilament strand including the impregnating agent.

In another preferred embodiment the amount of glass is in the range of 50 wt. % to 70 wt. %, on basis of the total weight of the sheathed continuous multifilament strand including the impregnating agent.

The present inventors found that that the thickness of the thermoplastic polymer sheath is preferably at least 0.32 mm. In a preferred embodiment said range is from 0.32-0.55 mm. A thickness of the thermoplastic sheath lower than 0.32 mm will more likely result in the "zebra-effect", whereas a thickness of the thermoplastic sheath higher than 0.55 mm may result in cooling problems. More in particular, when the thermoplastic polymer sheath is set at a thickness above 0.55 mm it takes longer for the thermoplastic polymer to cool to the desired temperature at which the sheathed multifilament strand is cut into pellets. Consequently, a thickness of above 0.55 mm requires either a reduction of line speed and/or an increased cooling path-length and/or more vigorous cooling.

For the avoidance of doubt it should be understood that the present invention is directed to embodiments wherein the sheath has an equal thickness in any radial direction. Some variations may however occur and in case the thickness at radial positions would differ the term "thickness" should be understood to mean minimum thickness.

The continuous glass multifilament strands to be used in the present method have of from 500 to 10000 glass filaments per strand, more preferably from 2000 to 5000 glass filaments per strand, because of high throughput, wherein the diameter of the glass filaments in said continuous multifilament strand ranges from 5 to 50 microns, more preferably from 10 to 30 microns and most preferably from 15 to 25 microns. A preferred embodiment of the sheath of thermoplastic polymer is a polypropylene, such as a propylene homopolymer with a melt flow index, MFI, of 15-100 g/10 min, preferably 25 to 75 g/10 min (ISO 1133, 230° C./2.16 kg). Other examples of thermoplastic polymer will be discussed hereafter.

The present process for producing a glass fibre-reinforced thermoplastic polymer composition further comprises a step of cutting the sheathed continuous glass multifilament strand into pellets.

In addition, the present process for producing a glass fibre-reinforced thermoplastic polymer composition further comprises a step of moulding the glass fibre-reinforced thermoplastic polymer composition into (semi-)finished articles.

The process for producing a glass fibre-reinforced thermoplastic polymer composition comprises a step of unwinding from a package at least one continuous glass multifilament strand containing a sizing composition. Glass multifilament strands containing a sizing composition and their preparation are known in the art. The glass filaments may have been formed by any method known to those skilled in the art. Particularly, the glass filaments have been formed by a melt spinning process. Applying a sizing composition to the formed glass filaments is also well-known in the art. Suitable examples of conventional sizing compositions include solvent-based compositions, such as an organic material dissolved in aqueous solutions or dispersed in water and melt- or radiation cure-based compositions. More particularly, an aqueous sizing composition is traditionally applied on the individual glass filaments. Additional components known to the skilled person may be present in the sizing composition. Suitable examples include lubricants, used to prevent damage to the strands by abrasion, antistatic agents, crosslinking agents, plasticizers, surfactants, nucleation agents, antioxidants, pigments, coupling agents and any combinations thereof.

Typically, after applying the sizing on the glass filaments, the filaments are bundled into strands and then wound on bobbins to form a package. Preferably, strand(s) comprising continuous glass multifilaments on which a sizing composition has been applied as aqueous dispersion are employed in the process according to the invention.

Impregnation agent is usually applied in an amount of from 0.5 to 20% by mass of the sheathed continuous multifilament strand. The impregnating agent is preferably non-volatile, has a melting point of at least about 20° C. below the melting point of the thermoplastic matrix, has a viscosity of from 2.5 to 100 cS at application temperature and is compatible with the thermoplastic polymer to be reinforced. As discussed above, the application of the impregnating agent may be carried out on each individual continuous glass multifilament strand or on a combination of two or more continuous glass multifilament strands. The application of the impregnating agent always takes place before the application of the polymeric sheath.

No intermediate steps, such as for example storage or cooling, is performed between the step of applying the impregnating agent and the step of applying the thermoplastic polymer sheath. In practice both steps may be performed directly after each other. Between the steps of unwinding and impregnating the glass multifilament strand, additional steps known to a skilled person may optionally be applied, like preheating of the glass fibres or spreading the glass filaments by pulling the strand over guide members or integrity breakers. It is, however, an advantage of the present process that such steps are not necessary to make good quality products at high speed.

According to the present invention, the impregnating agent should be compatible with the thermoplastic polymer to be reinforced, and may even be soluble in said polymer. The impregnating agent is preferably non-volatile, and substantially solvent-free. Being non-volatile means that the impregnating agent does not evaporate under the application and processing conditions applied; that is it has a boiling point or range higher than said processing temperatures.

The present invention is not limited to a certain impregnating agent, however it is highly preferred to use an impregnating agent as defined in WO 2009/080821. That is, the impregnating agent is non-volatile, has a melting point of at least about 20° C. below the melting point of the thermoplastic polymer sheath and has a viscosity of from 2.5 to 100 cS at application temperature. The viscosity of the impregnating agent is lower than 100 cS, preferably lower 5 than 75 cS and more preferably lower than 25 cS at application temperature. The viscosity of the impregnating agent is higher than 2.5 cS, preferably higher than 5 cS, and more preferably higher than 7 cS at the application temperature. An impregnating agent having a viscosity higher than 100 cS is difficult to apply to the continuous strand of glass fibres. Low viscosity is needed to facilitate good wetting performance of the glass fibres, but an impregnating agent having a viscosity lower than 2.5 cS is difficult to handle, e.g., the amount to be applied is difficult to control. The melting temperature of the impregnating agent is at least about 20° C., preferably at least 25° C. or at least 30° C. below the melting point of the thermoplastic polymer sheath. The application temperature of the impregnating agent is selected such that the desired viscosity range is obtained. The amount of impregnating agent that is applied depends inter alia on the thermoplastic polymer used for the sheath, the size (diameter) of the glass fibres of the continuous strand, and on the type of sizing that is on the surface of the glass fibres. According to the present invention, the amount of impregnating agent applied to the continuous strand of glass fibres should be higher than 0.5 wt. %, preferably higher than 2 wt. %, more preferably higher than 4 wt. %, more preferably higher than 6. wt % based on the weight of the glass fibres (including the sizing composition). The amount of impregnating agent should be lower than 20 wt. % preferably lower than 18 wt. %, more preferably lower than 15 wt. % more preferably lower than 12 wt. %. A certain minimum amount of impregnating agent is desired to assist homogeneous dispersion of glass fibres in the thermoplastic polymer matrix during moulding. An excess of impregnating agent may result in decrease of mechanical properties of the moulded articles. Suitable examples of impregnating agents for use in combination with polypropylene as the material for the sheath may comprise highly branched poly(alpha-olefins), such as polyethylene waxes, modified low molecular weight polypropylenes, mineral oils, such as, paraffin or silicon and any mixtures of these compounds. Preferably, the impregnating agent comprises a highly branched poly(alpha-olefin) and, more preferably, the impregnating agent is a highly branched polyethylene wax. The wax may optionally be mixed with a hydrocarbon oil or wax like a paraffin oil to reach the desired viscosity. WO 2009/080281 discloses as an impregnating agent a blend of 30 wt. % Vybar 260 (hyper branched polymer supplied by Baker Petrolite) and 70 wt % Paralux oil (paraffin, supplied by Chevron). The term non-volatile means that the impregnating agent does not evaporate under the application and processing conditions applied. In the context of the present invention, "substantially solvent-free" means that the impregnating agent contains less than 10% by mass of solvent, preferably less than 5% by mass solvent. Most preferably, the impregnating agent does not contain any solvent. The impregnating agent may further be mixed with other additives known in the art. Suitable examples include lubricants; antistatic agents; UV stabilizers; plasticizers; surfactants; nucleation agents; antioxidants; pigments; dyes; and adhesion promoters, such as a modified polypropylene having maleated reactive groups; and any combinations thereof, provided the viscosity remains within the desired range.

In a preferred embodiment the impregnating agent contains at least 70 wt. % of microcrystalline wax based on the weight of the impregnating agent. In that respect it is to be understood that the microcrystalline wax may be a single microcrystalline wax or a blend of several microcrystalline waxes. Microcrystalline waxes are well known materials. In general a microcrystalline wax is a refined mixture of solid saturated aliphatic hydrocarbons, and produced by de-oiling certain fractions from the petroleum refining process. Microcrystalline waxes differ from refined paraffin wax in that the molecular structure is more branched and the hydrocarbon chains are longer (higher molecular weight). As a result the crystal structure of microcrystalline wax is much finer than paraffin wax, which directly impacts many of the mechanical properties of such materials. Microcrystalline waxes are tougher, more flexible and generally higher in melting point compared to paraffin wax. The fine crystalline structure also enables microcrystalline wax to bind solvents or oil and thus prevents the sweating out of compositions. Microcrystalline wax may be used to modify the crystalline properties of paraffin wax. Microcrystalline waxes are also very different from so called iso-polymers. First of all, microcrystalline waxes are petroleum based whereas iso-polymers are poly-alpha-olefins. Secondly iso-polymers have a very high degree of branching of above 95%, whereas the amount of branching for microcrystalline waxes generally lies in the range of from 40-80 wt. %. Finally, the melting point of iso-polymers generally is relatively low compared to the melting temperature of microcrystalline waxes. All in all, microcrystalline waxes form a distinct class of materials not to be confused either by paraffin or by iso-polymers. The remaining at most 30 wt % of impregnating agent may contain a natural or synthetic wax or an iso-polymer. Typical natural waxes are animal waxes such as bees wax, lanolin and tallow, vegetable waxes such as carnauba, candelilla, soy, mineral waxes such as paraffin, ceresin and montan. Typical synthetic waxes include ethylenic polymers such as polyethylene wax or polyol ether-ester waxes, chlorinated naphtalenes and Fisher Tropsch derived waxes. A typical example of an iso-polymer, or hyper-branched polymer, is Vybar 260 mentioned above. In an embodiment the remaining part of the impregnating agent contains or consists of one or more of a highly branched poly-alpha-olefin, such as a polyethylene wax, paraffin. In a preferred embodiment the impregnating agent comprises at least 80 wt %, more preferably at least 90 wt % or even at least 95 wt % or at least 99 wt % of microcrystalline wax. It is most preferred that the impregnating agent substantially consists of microcrystalline wax. In an embodiment the impregnating agent does not contain paraffin. The term substantially consists of is to be interpreted such that the impregnating agent comprises at least 99.9 wt. % of microcrystalline wax, based on the weight of the impregnating agent.

The microcrystalline wax preferably has one or more of the following properties:
  a drop melting point of from 60 to 90° C. as determined in accordance with ASTM D127
  a congealing point of from 55 to 90° C. as determined in accordance with ASTMD938
  a needle pen penetration at 25° C. of from 7 to 40 tenths of a mm as determined in accordance with ASTM D1321
  a viscosity at 100° C. of from 10 to 25 mPa·s as determined in accordance with ASTM D445 an oil content of from 0 to 5 wt. % preferably from 0 to 2 wt % based on the weight of the microcrystalline wax as determined in accordance with ASTM D721

In an even more preferred embodiment the microcrystalline wax has all these properties in combination.

Any method known in the art may be used for applying the liquid impregnating agent to the continuous strand of glass fibres. Suitable methods for applying the impregnating agent include applicators having belts, rollers, and hot melt applicators. Such methods are for example disclosed in documents EP0921919, EP0994978B 1, EP0397505B1 and references cited therein. The application of the impregnating agent to the continuous multifilament strand can be carried out on each individual continuous multifilament strand, but can also be carried out at once on two or even three continuous multifilament strands.

The next step in both cases is that the impregnated continuous multifilament strands are provided with a joint thermoplastic polymer sheath, wherein said sheath of thermoplastic polymer surrounds said at least two continuous glass multifilament strands in such a way that said at least two continuous glass multifilament strands are in close contact with each other. This means basically that the sheath of thermoplastic polymer does not form a physical barrier between the continuous glass multifilament strands within that sheath of thermoplastic polymer.

The thermoplastic polymer used in the present invention is polypropylene. Preferably, the thermoplastic polymer used in the sheathing process is a crystalline polypropylene, like a propylene homopolymer, a random copolymer, or a so-called heterophasic copolymer of propylene and ethylene and/or another alpha-olefin having a melt flow index, MFI, of 15-100 g/10 min, preferably 25 to 75 g/10 min (ISO1133, 230° C./2.16 kg).

The thermoplastic polymer may further contain one or more of usual additives, like stabilisers, processing aids, impact-modifiers, flame-retardants, acid scavengers, inorganic fillers, colorants, or components that further enhance properties of the reinforced compound, like compounds that enhance interfacial bonding between polymer and glass filaments. An example of the last compounds is a functionalized polyolefin, like a maleated polypropylene, in case the thermoplastic is a polypropylene.

Any method known in the art to apply a sheath of thermoplastic polymer around the at least two continuous multifilament strands may be used in present invention. The sheathing or wire-coating process typically involves the application of a polymer layer on the outer surface of the at least two continuous glass strands as they pass through the polymer melt in a die. The resulting sheathed multiple continuous multifilament strands comprise a core with multiple impregnated glass multifilament strands and a sheath comprising a thermoplastic polymer. No, or subsantially no thermoplastic polymer will be present between the multiple impregnated glass multifilament strands and/or the individual filaments of such strands.

The process according to the invention, optionally including the application of impregnating agent can be run at line speeds of at least 100 m/min, preferably at least 200 m/min, more preferably at least 300 m/min. In a preferred embodiment the line speed may be from 300-500 m/min such as from 350 to 500 m/min. If the speed goes above 500 m/min the cooling of the sheathed strand prior to cutting becomes more problematic.

The process of the invention may further comprise a step wherein the multiple sheathed continuous glass multifilament strands are cut or chopped into long fibre pellets or granules of desired length, suitable for further processing into (semi)-finished articles. The length of the glass fibres in the pellets or granules is typically substantially the same as the pellet or granule length, and may vary from 2 to 50 mm, preferably from 5 to 30 mm, more preferably from 6 to 20 and most preferably from 10 to 16 mm. The amount of glass fibres in the pellets or granules obtained with the process according to the invention may vary between 5 and 90 mass %, based on the total mass of the composition, preferably between 35 and 75 mass %, more preferably between 50 and 70 mass %.

The process according to present invention may comprise a further step of moulding the long glass fibre-reinforced thermoplastic polymer composition in pellet form into (semi-)finished articles. Suitable examples of moulding processes include injection moulding, compression moulding, extrusion and extrusion compression moulding. Injection moulding is widely used to produce articles such as automotive exterior parts like bumpers, automotive interior parts like instrument panels, or automotive parts under the bonnet. Extrusion is widely used to produce articles such rods, sheets and pipes.

The invention also relates to moulded articles, made from the glass fibre reinforced thermoplastic polymer composition as obtained with the process according to the invention. More in detail, the present invention also relates to (semi-) finished articles on basis of a glass fibre-reinforced thermoplastic polymer composition, wherein said thermoplastic polymer composition comprises at least two continuous glass multifilament strands together provided within the same sheath of thermoplastic polymer.

The invention will be further elucidated with reference to the following non-limiting experiments.

EXAMPLES

Several long glass fibre-reinforced polypropylene compositions, comprising 40 mass % of glass fibres were produced by using SABIC® PP579S propylene homopolymer with a MFI of 45 g/10 min (ISO 1133, 230° C./2.16 kg) as polymer matrix. The polymer matrix further comprised 0.3 mass % of a 40 mass % Carbon Black Masterbatch (CBM), 1.8 mass % of a functionalized polypropylene (40 wt. % glass embodiment), respectively and stabilisers. The glass fibres used were standard Type 30 roving SE4220, supplied by 3B as a roving package, have filament diameter of 19 microns and contain aminosilane-containing sizing composition. The continuous glass multifilament strands were unwound from the package and transported to the impregnating agent applicator. The impregnating agent, similar to the impregnating agent disclosed in WO2009/0808231 was molten and mixed at a temperature of 160° C. and applied to the continuous glass multifilament strand after unwinding from the package by using an applicator. In the Table one can see the number of strands within the polymeric sheath. The Examples indicated with "Reference" are examples in which only one continuous glass multifilament strand was present within the polymeric sheath and thus qualified as comparative examples. When two continuous glass multifilament strands were used, the impregnating step was carried out in a single step on the continuous glass multifilament strands. The sheathing step was performed in-line directly after the impregnating step, using a 75 mm twin screw extruder (manufactured by Berstorff, screw UD ratio of 34), at a temperature of about 250° C., which fed the molten polypropylene matrix material to an extruder-head wire-coating die. The line speed for impregnating and sheathing can be found in the Table. The sheathed strand was cut into pellets of 15 mm length. The results are given in the Table below wherein:

Line speed means the speed of the production line in meters per minute

Throughput means the throughput in terms of weight corresponding to the line speed.

Zebra means a qualitative analysis on the occurrence of the zebra effect

Push out is a measure for the quality of the pellets so produced and as further detailed below. It is expressed as number of pellets per hundred pellets.

Push Out Test:

One hundred pellets are randomly selected by an operator from a batch of pellets. Next, for each of the hundred pellets the operator uses a needle having a blunt tip with a surface area slightly smaller than the surface area of the core of the pellet, i.e. the surface area occupied by the glass fibres and then tries to push out the glass fibres using this needle. The amount of successful push outs per 100 pellets is reported. This method, although somewhat subjective gives a fair indication for the tendency of glass fibres separating from the pellets. The "push out" is reported in number of push outs per hundred pellets. In the experiments below all push out tests were carried out by the same operator.

Push out were tested on virgin pellets, i.e. pellets directly obtained after their manufacture and after the pellets cooled to room temperature.

|  | CE 1 | CE 2 | E1 | E2 | CE3 |
|---|---|---|---|---|---|
| # of strands | 1 | 1 | 2 | 2 | 1 |
| Line speed [m/min] | 300 | 200 | 200 | 150 | 300 |
| Throughput [kg/hr] | 135 | 90 | 180 | 135 | 135 |
| Zebra | yes | yes | No | No | Yes |
| Push out [1/100] | 29 | 33 | 14 | 15 | 38 |

The results show that the use of multiple strands per pellet does not result in zebra formation and moreover allows high throughput even though the line speed is somewhat reduced. In addition the "push out", indicative for the coupling of the glass fibres to the sheath, is improved.

In the Table above the theoretical thermoplastic sheath thickness (mm) is 0.38 (CE1), 0.38 (CE2), 0.53 (E1), 0.53 (E2) and 0.38 (CE3), respectively.

The invention claimed is:

1. A process for producing a glass fibre-reinforced thermoplastic polymer composition, comprising the sequential steps of
   unwinding at least two continuous glass multifilament strands from a package; and
   applying a sheath of thermoplastic polymer around said at least two continuous glass multifilament strands to form the composition,
   wherein:
      said at least two continuous glass multifilament strands together are provided within said sheath of thermoplastic polymer,
      the thermoplastic polymer of the sheath is polypropylene,
      said sheath surrounds said at least two continuous glass multifilament strands,
      an amount of glass in the composition is from 35 to 75 wt. % on the basis of the total weight of the composition, and
      wherein a thickness of the thermoplastic sheath is 0.32 mm-0.55 mm.

2. The process according to claim 1, wherein the amount of glass is in the range of 50 wt. % to 70 wt. %.

3. The process according to claim 1, wherein at least three continuous glass multifilament strands together are provided within said sheath of thermoplastic polymer, wherein said sheath of thermoplastic polymer surrounds said at least three continuous glass multifilament strands.

4. The process according to claim 1, wherein an impregnating agent is applied to each of said at least two continuous glass multifilament strands before the application of said sheath of thermoplastic polymer around said at least two continuous glass multifilament strands.

5. The process according to claim 4, wherein the impregnating agent is applied to each of said at least two continuous glass multifilament strands separately before the application of said sheath of thermoplastic polymer around said at least two continuous glass multifilament strands.

6. The process according to claim 4, wherein an impregnating agent is applied to each of said at least two continuous glass multifilament strands together before the application of said sheath of thermoplastic polymer around said at least two continuous glass multifilament strands.

7. The process according to claim 4, wherein no intermediate steps are performed between the step of applying the impregnating agent and the step of applying the thermoplastic polymer sheath.

8. The process according to claim 4, wherein the impregnating agent is applied in an amount of from 0.5 to 20%, based on a weight of the at least two continuous glass multifilament strands.

9. The process according to claim 8, wherein the impregnating agent is applied in an amount of higher than 4 wt. % and lower than 15 wt. %, based on a weight of the at least two continuous glass multifilament strands.

10. The process according to claim 1, wherein the continuous glass multifilament strands have 500 to 10000 glass filaments per strand and wherein a diameter of the glass filaments in said continuous glass multifilament strands ranges from 5 to 50 microns.

11. The process according to claim 1, wherein the polypropylene is a propylene homopolymer, with a melt flow index, MFI, of 15-100 g/10 min (ISO 1133, 230° C./2.16 kg).

12. The process according to claim 1, further comprising a step of cutting the glass fibre-reinforced thermoplastic polymer composition into pellets.

13. The process according to claim 1, wherein a line speed for producing the composition is 100 to 500 m/min.

14. The process according to claim 1, further comprising a step of moulding the glass fibre-reinforced thermoplastic polymer composition into (semi-)finished articles.

15. The process according to claim 1, wherein the continuous glass multifilament strands have from 2000 to 5000 glass filaments per strand, and wherein a diameter of the glass filaments in said continuous glass multifilament strands ranges from 10 to 30 microns.

16. The process according to claim 15, wherein the polypropylene is a propylene homopolymer, with a melt flow index, MFI, of 25 to 75 g/10 min (ISO 1133, 230° C./2.16 kg).

17. A process for producing a glass fibre-reinforced thermoplastic polymer composition, comprising the sequential steps of unwinding from a package at least two continuous glass multifilament strands; and applying a sheath of thermoplastic polymer around said at least two continuous glass multifilament strands to form the glass fibre-reinforced thermoplastic polymer composition, wherein:

said at least two continuous glass multifilament strands together are provided within said sheath of thermoplastic polymer, the thermoplastic polymer of the sheath is polypropylene, said sheath surrounds said at least two continuous glass multifilament strands, an amount of glass in the composition is from 35 to 75 wt. % on the basis of the total weight of the composition, and wherein the at least two continuous glass multifilament strands have from 2000 to 5000 glass filaments per strand.

* * * * *